(12) United States Patent
Sugiyama et al.

(10) Patent No.: US 6,687,076 B2
(45) Date of Patent: *Feb. 3, 2004

(54) RECORDING MEDIUM AND APPARATUS FOR PROTECTING COPYRIGHTED DIGITAL DATA

(75) Inventors: Koichi Sugiyama, Kanagawa (JP); Etsurou Sakamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/994,994

(22) Filed: Nov. 14, 2001

(65) Prior Publication Data

US 2002/0034032 A1 Mar. 21, 2002

Related U.S. Application Data

(60) Continuation of application No. 08/803,359, filed on Feb. 20, 1997, which is a division of application No. 08/576,171, filed on Dec. 21, 1995, now Pat. No. 5,923,486.

(30) Foreign Application Priority Data

Dec. 22, 1994 (JP) .............................. 6-336503
Jan. 12, 1995 (JP) .............................. 7-019667

(51) Int. Cl.[7] ............................................. G11B 15/18
(52) U.S. Cl. ................................... 360/69; 360/60
(58) Field of Search ...................... 360/60, 69

(56) References Cited

U.S. PATENT DOCUMENTS

| | | |
|---|---|---|
| 4,740,890 A | 4/1988 | William |
| 4,858,036 A | 8/1989 | Ginkel |
| 5,060,219 A | 10/1991 | Lokhoff et al. |
| 5,159,182 A | 10/1992 | Eisele |
| 5,214,556 A | 5/1993 | Kilbel |
| 5,231,546 A | 7/1993 | Shimada |
| 5,243,485 A | 9/1993 | Weiley |
| 5,293,422 A | 3/1994 | Loiacono |
| 5,379,433 A | 1/1995 | Yamagishi |
| 5,418,852 A | 5/1995 | Itami et al. |
| 5,418,853 A | 5/1995 | Kanota et al. |
| 5,434,721 A | 7/1995 | Sawada et al. |
| 5,453,968 A | 9/1995 | Veldhuis et al. |
| 5,579,120 A | 11/1996 | Oguro |
| 5,644,444 A | 7/1997 | Braithwaite et al. |
| 5,650,991 A | 7/1997 | Fujiie |
| 5,652,838 A | 7/1997 | Lovett et al. |
| 5,825,969 A | 10/1998 | Ono et al. |
| 5,923,486 A | 7/1999 | Sugiyama et al. |

Primary Examiner—David Hudspeth
Assistant Examiner—Kin Wong
(74) Attorney, Agent, or Firm—Frommer Lawrence & Haug LLP; William S. Frommer

(57) ABSTRACT

Copying, dubbing or reproducing copyrighted digital data can be inhibited or restricted to properly protect a copyright. AV data recorded on a pre-recorded tape is output from a reproducing unit of a first digital VCR with protective information indicating whether the copy of the AV data is inhibited or not. The protective information is input with the A/V data to a second digital VCR. Copy permission information of a blank tape loaded in the second digital VCR is discriminated and the second digital VCR records the AV data supplied from the first digital VCR based on the protective information and the copy permission information.

4 Claims, 12 Drawing Sheets

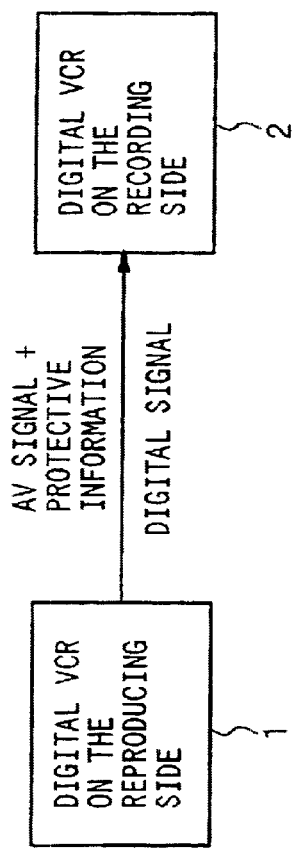

DIGITAL VTR ON THE REPRODUCING SIDE

DIGITAL VTR ON THE RECORDING SIDE

ROM OR RAM IS LOADED
(RECORDING PERMISSION
INFO/PROTECTIVE INFO
ARE INCLUDED)

DETECTION HOLE

BAR CODE

RECORDING AREA OF AV SIGNAL ETC.

TAPE

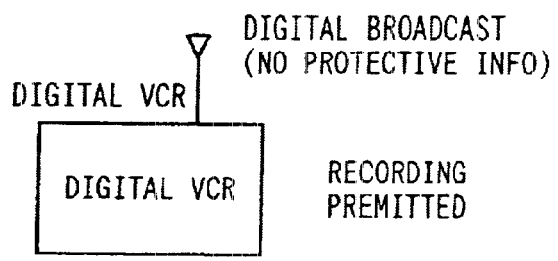
MEDIA WITHOUT COPY PERMISSION INFO
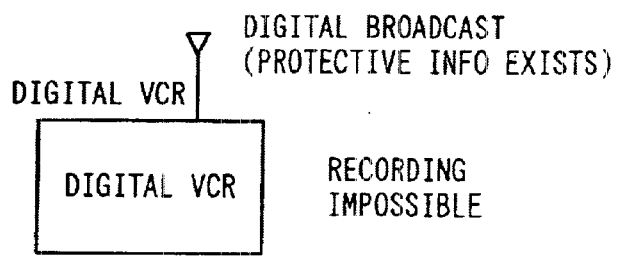
MEDIA WITHOUT COPY PERMISSION INFO
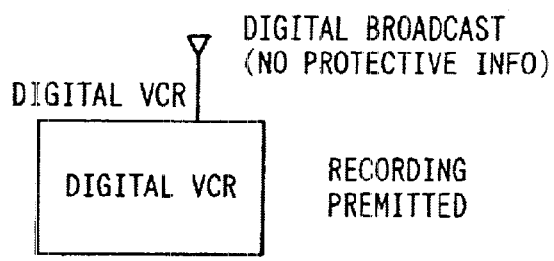
MEDIA WITH COPY PERMISSION INFO
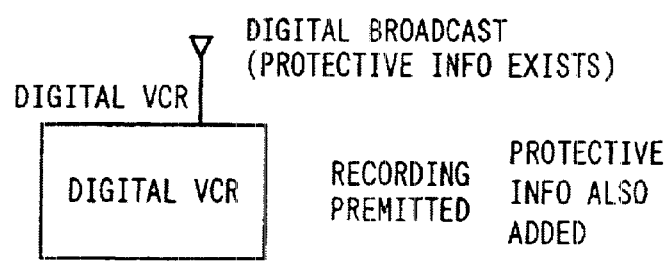
MEDIA WITH COPY PERMISSION INFO

RECORDING MEDIUM AND APPARATUS FOR PROTECTING COPYRIGHTED DIGITAL DATA

This application is a continuation of prior application Ser. No. 08/803,359 filed Feb. 20, 1997, which is a divisional of application Ser. No. 08/576,171 filed Dec. 21, 1995, now U.S. Pat. No. 5,923,486.

BACKGROUND OF THE INVENTION

The invention relates to digital data recording medium, AV apparatus, and AV system which can easily control the recording or dubbing of a digital signal which is supplied from, for example, a television station or a digital VCR.

The invention also relates to a recording medium and a recording and reproducing apparatus which inhibits or restricts the recording (dubbing) and reproduction of a digital signal in order to protect its copyright.

In a digital recording and reproducing apparatus, for example, a digital VCR, there is hardly any deterioration of picture quality or sound quality during a dubbing (i.e., copying) process. Therefore, it is necessary to inhibit or restrict the dubbing or reproduction of certain data to protect a copyright. When an analog signal is input, converted to a digital signal and recorded, copyright protective information is superimposed in a vertical blanking period (V blanking period) of the analog signal to inhibit or restrict the dubbing of the digital signal.

In a pre-recorded tape for a conventional analog VCR, in order to protect the copyright, a copyright protective signal formed of a plurality of pairs, each comprising a sync pulse and a positive pulse, is superimposed in the V blanking period of the television signal. An Automatic Gain Control (AGC) of the recording section of a VCR is "confused" by such a signal, so that the dubbing cannot be performed. That is, in case of illegally copying a pre-recorded tape, the dubbed tape is copied so that it is unreproducible. Thus, the copyright is protected.

A VCR for an image compression system has been studied and developed. A digital VCR in which video and audio data are encoded, recorded and reproduced, such as the D1 component system, D2 composite system, and the like for business or professional use have been proposed with copyright protection. For instance, in an industrial-use digital VCR, signals such as the V blanking period and the horizontal blanking period (H blanking period) which do not represent image information are not recorded. Namely, only signals in the useful image portion are extracted, compressed, and recorded. Upon reproduction, such image data is subjected to processes opposite to those executed upon recording, so that the V and H blanking periods which were not recorded are added to the processed image data and the resultant data is output as a composite video signal.

FIG. 10 is a diagram showing an AV (audio/video) system for dubbing a pre-recorded tape onto a blank tape using digital VCRs. In FIG. 10, when a pre-recorded tape 101 is reproduced by a VCR 102, digital data, such as AV data, recorded on tape 101 is supplied through a cable 103 to a VCR in which a blank tape 105 is loaded. Tape 101, recorded by a compression system used in professional digital VCRs, as mentioned above, only contain data of the useful image portion; therefore, since there is no V blanking period, the analog VCR copyright protection techniques are not adequate when recording or dubbing signals using the digital VCR.

OBJECTS AND SUMMARY OF THE INVENTION

It is, therefore, an object of the invention to provide a digital data recording medium, an AV apparatus, and an AV system which easily permits, inhibits or restricts the recording or dubbing of a digital signal from a television station or a digital VCR.

It is particularly desired to protect the copyright since the digital video signal representing the copyrighted program does not deteriorate when it is dubbed. Therefore, copyright protective information is superimposed onto the transmitted or pre-recorded digital signal to thereby inhibit or restrict the dubbing or reproduction of the signal. Thus, the copyright can be properly protected.

It is, therefore, another object of the invention to provide a recording medium having copyright protective information to inhibit or restrict the dubbing and/or the reproduction of a protected signal stored thereon.

Another object of the invention is to provide a reproducing apparatus which inhibits or restricts the reproduction of a protected signal based on copyright protective information on the recording medium.

A further object of the invention is to provide a recording and reproducing apparatus which inhibits or restricts the dubbing and/or the reproduction of a protected signal based on copyright protective information on the recording medium.

There is provided a medium with copyright protective information and digital data stored thereon. A reproducing apparatus reproduces the digital data and outputs it to a recording apparatus during a dubbing operation; but the copyright protective information permits or inhibits recording of that signal. A copy permission signal in the recording medium acts with the copyright protective information to permit or prohibit recording of the digital data.

Another aspect of the invention provides A/V apparatus into which the medium is loaded to perform the reproduction/record or inhibit operation.

The copyright protective information is indicative of, for example, recording permission or inhibition; reproducing permission or inhibition; prepaid fee information for recording time information or its recording time; prepaid fee information for reproducing time information or its reproducing time; royalty per unit of recording time; royalty per unit of reproducing time, etc.

The copyright protective information is stored with the digital data or on the recording medium container, and in either case the A/V apparatus reads out the information and performs the designated function.

There are provided recording apparatus, reproducing apparatus, and recording and reproducing apparatus for using the recording medium and the information mentioned above to record, reproduce, and dub copyrighted information within legal bounds. Thus, an easier way to control access to the reproduction of copyrighted materials is provided.

The above and other objects and features of the present invention will become apparent from the following detailed description with reference to the accompanying drawings.

BRIEF DESCRIPTION OF THE DRAWINGS

FIG. 1 is a block diagram of an AV system used for dubbing;

FIG. 2 is a table showing the relations among protective information, copy permission information, and copy permission/inhibition;

FIGS. 7A, 7B, 7C and 7D are system diagrams for recording digital TV data;

DETAILED DESCRIPTION OF THE PREFERRED EMBODIMENTS

Figure 3A:
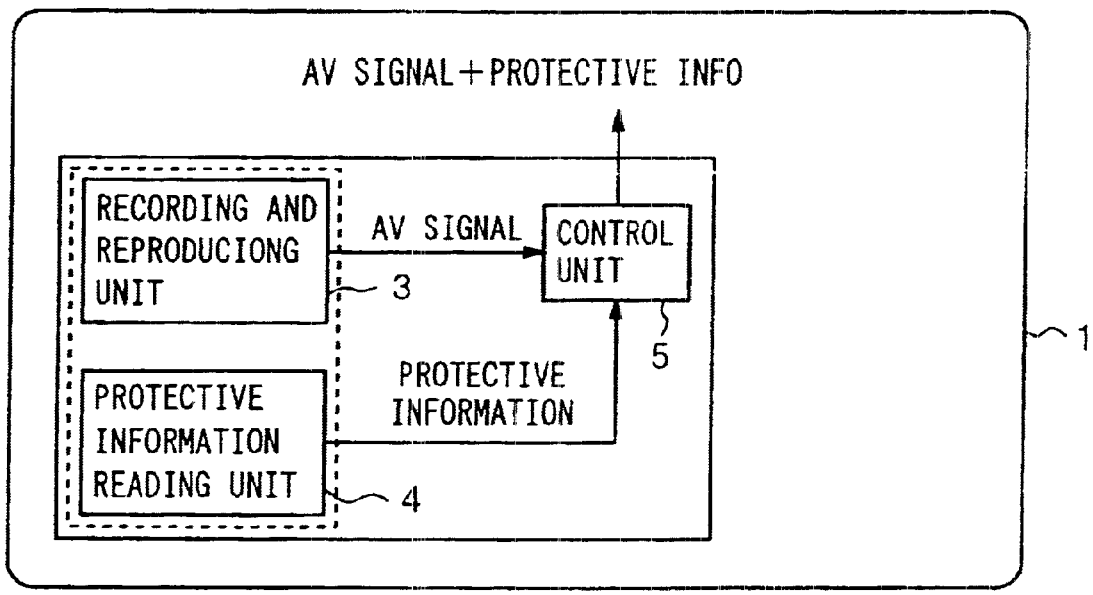
FIGS. 3A and 3B are block diagrams of the reproducing and recording sections of digital VCRs.

A preferred embodiment of the invention will now be described hereinbelow with reference to the drawings. FIG. 1 is a block diagram of an AV system used for dubbing AV data and protective information recorded on a pre-recorded tape loaded in a reproducing apparatus 1 (for example, a digital VCR), the reproduced data being output to a recording apparatus 2 (for example, a digital VCR). The protective information is stored in the digital data of the pre-recorded tape loaded in the reproducing apparatus or, for a transmission system, in the digital television data (DTV), which will be described later, transmitted from a broadcasting station. This protection information indicates whether dubbing is permitted or inhibited by the recording apparatus and is transmitted together with the AV data or DTV data. Rather than always transmitting the protective information, the protective information can be transmitted when dubbing is inhibited and not transmitted when dubbing is permitted.

A blank tape containing previously recorded copy permission information is loaded in recording apparatus 2. The copy permission information indicates whether the AV or DTV data can be recorded onto the blank tape. For example, if the copy permission information is indicative of permission to copy or not onto a blank tape, copyrighted data can be properly protected. For instance, where the protective information is not supplied from reproducing apparatus 1 or where the protective information indicative of the permission to copy is supplied from reproducing apparatus 1, dubbing can be executed regardless of the permission information recorded on the blank tape. Where the protective information indicative of copy inhibition is supplied from reproducing apparatus 1, that is, when copyrighted data constitutes the reproduced AV data, the copy permission information is important. Namely, where the copy permission information is indicative copy inhibition, the signal cannot be dubbed onto the blank tape. However, where the copy permission information is indicative of permission to copy, dubbing can be executed.

FIG. 2 is a table showing the relations among the protective information, copy permission information, and copy permission/inhibition. As mentioned above, where no protective information is transmitted, the AV or DTV data can be copied regardless of the copy permission information of the recording medium loaded in the recording apparatus. In addition, where protective information indicative of copy inhibition is transmitted from the reproducing apparatus and where there is no copy permission information in the recording medium or the copy permission information is indicative of copy inhibition, then copying cannot be performed. Even when the protective information indicative of the copy inhibition is transmitted from the reproducing medium, where the copy permission information indicates that copying is permitted onto the recording medium, the AV or DTV data can be copied. Where copying is inhibited, the user is notified by using, for example, an On Screen Display (OSD) on a monitor or the like.

Figure 3B:
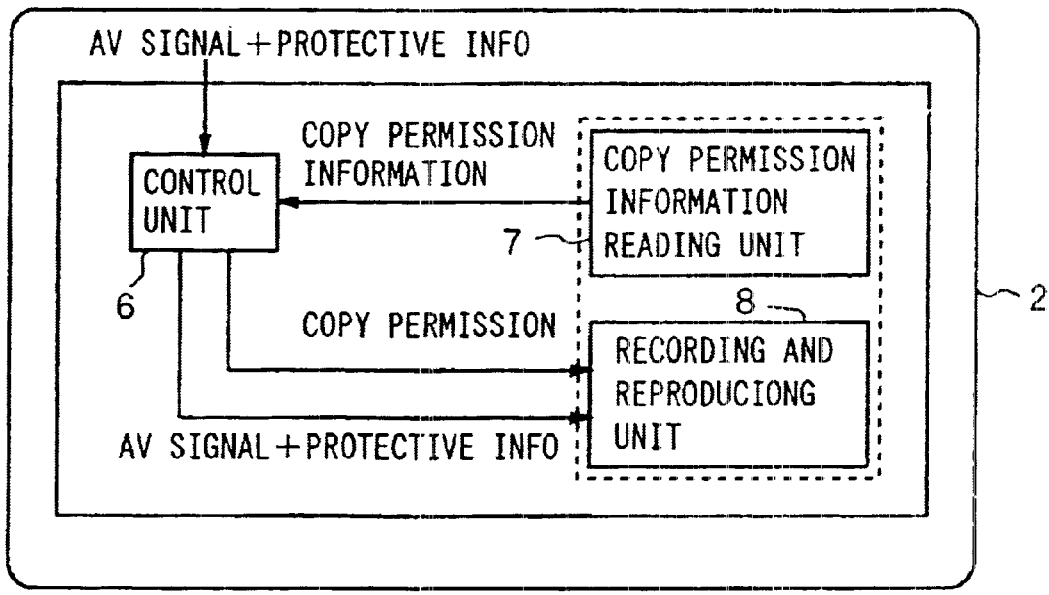

FIGS. 3A and 3B are diagrams of the recording and reproducing sections of digital VCRs. Reproducing apparatus 1, shown in FIG. 3A, reproduces the AV data recorded on the prerecorded tape from a recording/reproducing unit 3 and outputs the data to a control unit 5. Protective information, previously recorded on the pre-recorded tape, is read from the pre-recorded tape by a protective information reading unit 4 and output to control unit 5. The AV data and protective information are output from the control unit.

In the recording apparatus 2, shown in FIG. 3B, a control unit 6 receives the AV data and protective information transmitted from reproducing apparatus 1. The AV data and protective information are supplied from control unit 6 to a recording/reproducing unit 8.

If the protective information indicates that copying is permitted or if there is no protective information, regardless of the copy permission information stored on the blank tape loaded in recording apparatus 2, the AV data reproduced by reproducing apparatus 1 can be recorded by recording apparatus 2.

When the protective information is indicative of copy inhibition, a copy permission information reading unit 7 reads whether copy permission information has been recorded on the loaded blank tape and outputs the result to control unit 6. Control unit 6 sends a copy permission signal to recording/reproducing unit 8 based on the copy permission information. When there is no copy permission information or when the copy permission information is indicative of copy inhibition, the reproduced data cannot be copied. However, when the copy permission information indicates that copying is permitted, the reproduced data can be copied.

Figure 4:
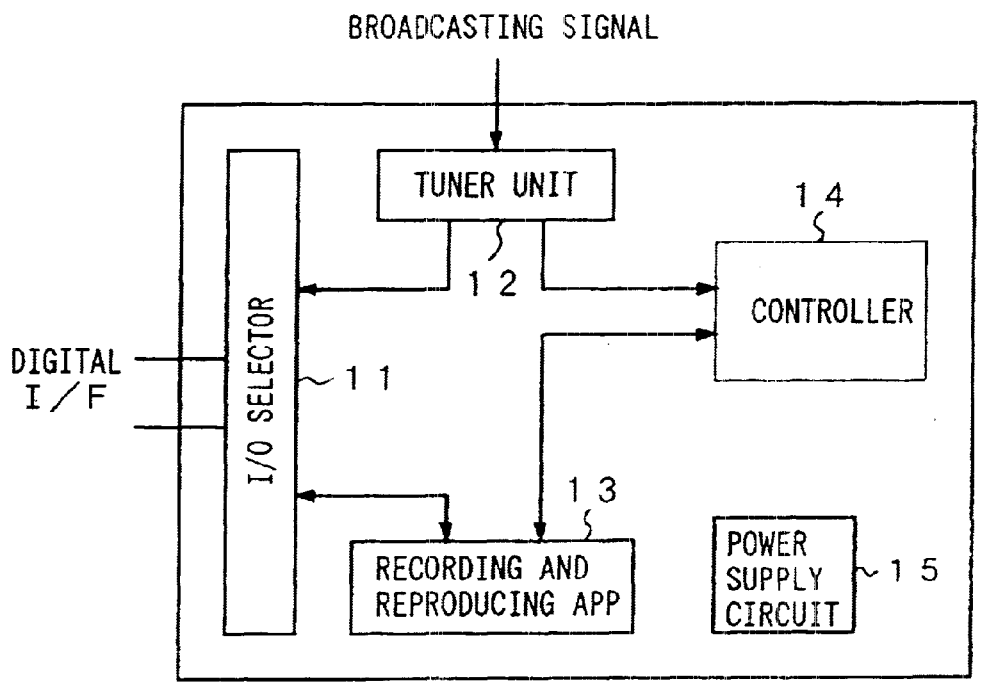
FIG. 4 is a block diagram of a digital VCR used for recording.

FIG. 4 is a block diagram of a digital VCR used for recording. The digital VCR comprises an input/output selector 11, a tuner unit 12, a recording and reproducing apparatus 13 in which a blank tape (not shown) has been loaded, a controller 14, and a power supply circuit 15. The tuner unit receives broadcasted DTV data and protective information indicative of whether copying is permitted. The controller generates a control signal indicating that data can be recorded by recording and reproducing apparatus 13. When the protective information is not transmitted from the tuner unit to the controller, a control signal indicating that the DTV data can be recorded regardless of the copy permission information that may be read from the loaded tape is supplied to the recording and reproducing apparatus.

When the protective information input to the controller from the DTV data is indicative of copy inhibition, the controller reads copy permission information from the blank tape. If the copy permission information from the blank tape indicates that data can be recorded, the DTV data can be copied; whereas if the copy permission information indicates recording inhibition, the DTV data cannot be recorded.

Figure 5:
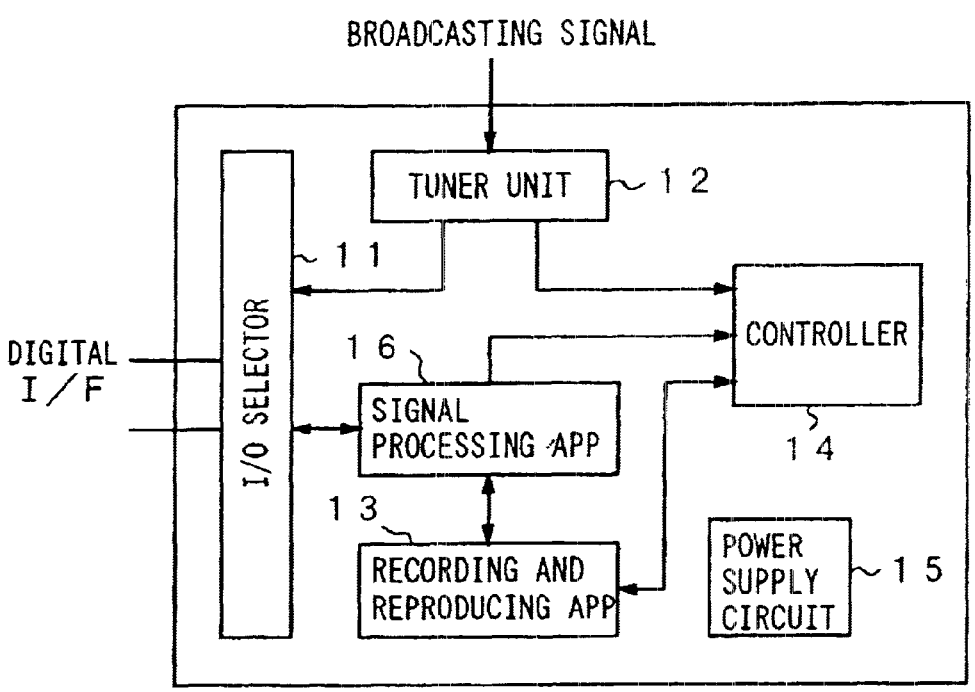
FIG. 5 is a block diagram of the digital VCR used for dubbing.

FIG. 5 is a block diagram of a digital VCR used for dubbing data from a pre-recorded tape. In FIG. 5, the same component elements as those shown in FIG. 4. are designated by the same reference numerals and so are not described below. Digital data and protective information from another digital VCR (not shown) are supplied to a signal processing apparatus 16, through an I/O selector 11. The protective information is inputted from the signal processing apparatus to controller 14. The controller generates a control signal indicating whether the AV data can be dubbed based on the protective information supplied from the signal processing apparatus. If no protective information or if protective information indicating that copying is permitted is supplied, then dubbing can be performed regardless of copy permission information stored on the blank tape.

When protective information indicative of copy inhibition is supplied to the controller 14, the controller reads the copy permission information from the blank tape loaded in recording and reproducing apparatus 13. If the copy permission information indicates that copying is permitted, such information is output from the recording and reproducing apparatus to the controller. Thus, dubbing can be executed. If the copy permission information indicates copy inhibition, then dubbing cannot be executed.

Figure 6A:
FIGS. 6A, 6B, 6C and 6D are diagrams showing methods of recording, storing or adding copy permission information or protective information onto a pre-recorded tape or a blank tape.
Figure 6B:
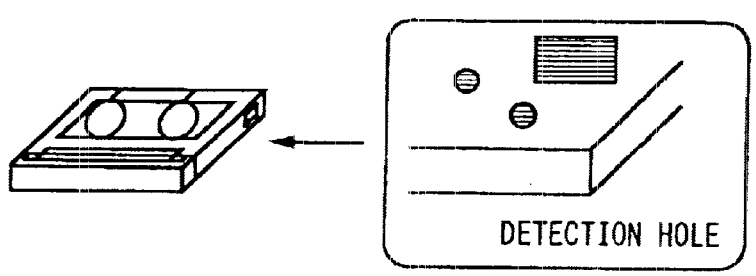
Figure 6C:
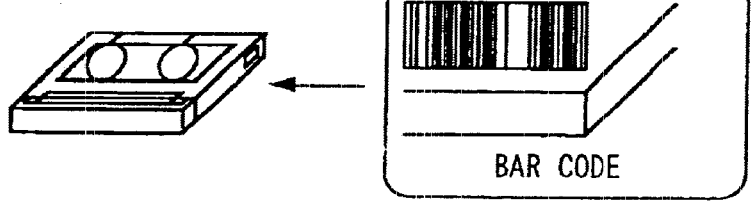
Figure 6D:
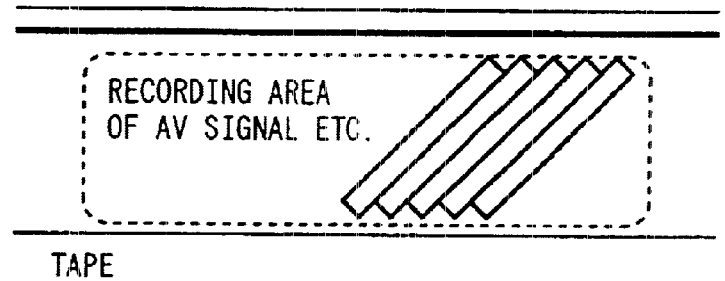

FIGS. 6A, 6B, 6C and 6D are diagrams showing a method of recording, storing or adding the foregoing copy permission information or protective information to a pre-recorded tape or a blank tape. In FIG. 6A, a memory device such as ROM, RAM, or the like is built into the tape cassette. The copy permission information or protective information is stored in the memory device. When the tape is loaded into recording and/or reproducing apparatus, information data in the memory device is read by that apparatus. In FIG. 6B, the presence of copy permission information or protective information is determined by states of detection holes formed on the cassette. In FIG. 6C, bar codes provided on the tape cassette are discriminated by the apparatus to determine whether copy permission information or protective information is stored on the tape. If FIG. 6D, tracks of copy permission information or protective information are provided at predetermined positions on the tape (for example, in a longitudinal track in an upper portion of the tape). Copy permission information or protective information may be recorded throughout the entire length of tape or only in a partial interval of the tape. The copy permission information or protective information recorded on the longitudinal track is read by a read-only fixed head of the apparatus. As mentioned above, by reading the copy permission or protective information in the memory device, detecting the states of the detection holes, discriminating bar codes, or reading the track, the copy permission information or protective information stored on the pre-recorded or blank tape is determined. Thus, whether recording or dubbing can be performed onto the loaded blank tape or from the pre-recorded tape is judged.

FIGS. 7A, 7B, 7C and 7D are diagrams showing the relation between the protective information and copy permission information when recording DTV data. FIG. 2 is referred to in order to better appreciate the following description.

As shown in FIG. 7A, when no protective information is transmitted with the DTV data and no copy permission information is stored on the blank tape loaded into the recording apparatus, recording is permitted.

As shown in FIG. 7B, when the protective information indicative of copy inhibition is transmitted with the DTV data and no copy permission information is stored on the blank tape loaded into the recording apparatus, recording is inhibited. If the protective information indicates that copying is permitted and no copy permission information is stored on the blank tape, recording is permitted, as in FIG. 7A.

As shown in FIGS. 7A and 7C, when no protective information is transmitted with the DTV data then the copy permission information stored on the blank tape loaded into the recording apparatus is irrelevant and recording is permitted.

When the protective information is transmitted with the DTV data and copy permission information is stored on the blank tape in the recording apparatus, as shown in FIG. 7D, there are four possibilities.

First, when protective information indicative of copy inhibition is transmitted and the copy permission information is indicative of copy inhibition, recording is not possible. Second and third, when the protective information indicates that copying is permitted and the copy permission information indicates that copying is permitted or inhibited, recording is permitted. Fourth, when the protective information is indicative of copy inhibition and the copy permission information indicates that copying is permitted, recording is permitted. In FIG. 7D, when recording is permitted pursuant to the fourth possibility, the protective information is recorded with the DTV data, so that similar protection and copy permission can be maintained for the dubbed data.

FIGS. 8A, 8B, 8C and 8D are system diagrams showing the relation between the protective information and copy permission information when dubbing data from a digital VCR.

Figure 8A:
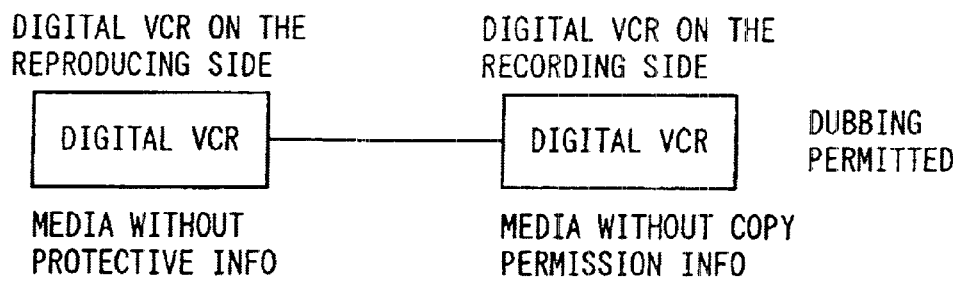
FIGS. 8A, 8B, 8C, and 8D are system diagrams for dubbing using a digital VCR.

In FIG. 8A, when a medium, such as a video tape or the like, having no protective information is loaded into the reproducing apparatus, dubbing is permitted regardless of the copy permission information of the recording medium, such as a blank tape, in the recording apparatus.

Figure 8B:
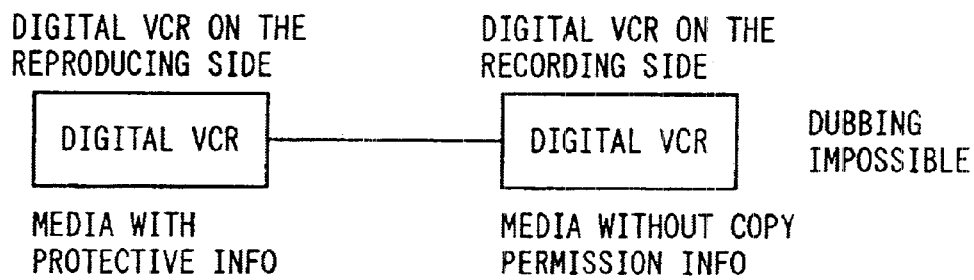

In FIG. 8B, when the medium, such as a pre-recorded tape or the like, which contains protective information indicative of copy inhibition is loaded into the reproducing apparatus and a blank tape without copy permission information is loaded into the recording apparatus, dubbing cannot be executed.

Figure 8C:
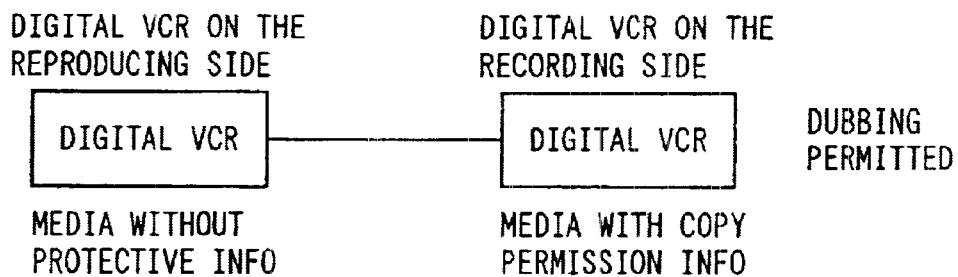

In FIG. 8C, when a medium having no protective information is loaded into the reproducing apparatus and a blank tape having copy permission information is loaded into the recording apparatus, dubbing is permitted.

Figure 8D:
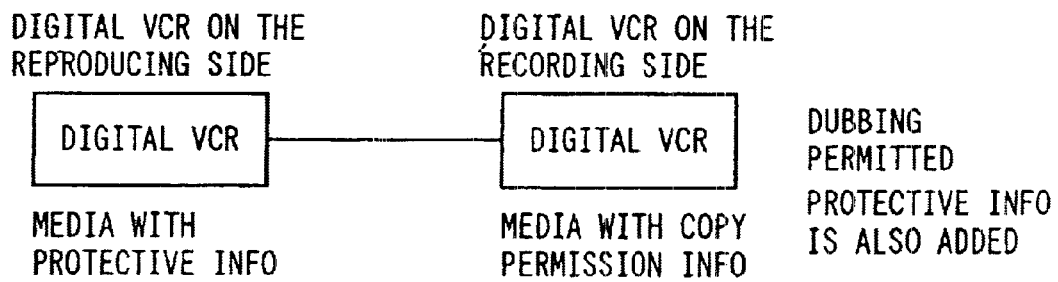

In FIG. 8D, when a medium having protective information is loaded into the reproducing apparatus and a blank tape having copy permission information is loaded into the recording apparatus, there are four possible cases.

First, in the case where the protective information is indicative of copy inhibition and the copy permission information is indicative of copy inhibition, dubbing cannot be executed. Second and third, when the protective information indicates that copying is permitted and the copy permission information indicates that copying is permitted or inhibited, dubbing is permitted. Fourth, when the protective information is indicative of copy inhibition and the copy permission information indicates that copying is permitted, dubbing is permitted. In FIG. 8D, the protective information is dubbed with the digital data for the fourth possibility, so that similar protection and copy permission can be maintained for the dubbed data.

FIGS. 9A, 9B, 9C and 9D show system diagrams for dubbing using a digital VCR when two stages or levels of protective information are used. By allocating states or levels to the protective information, even when copy permission information is stored on the blank tape loaded into the recording apparatus, dubbing onto the blank tape can be inhibited.

Figure 9A:
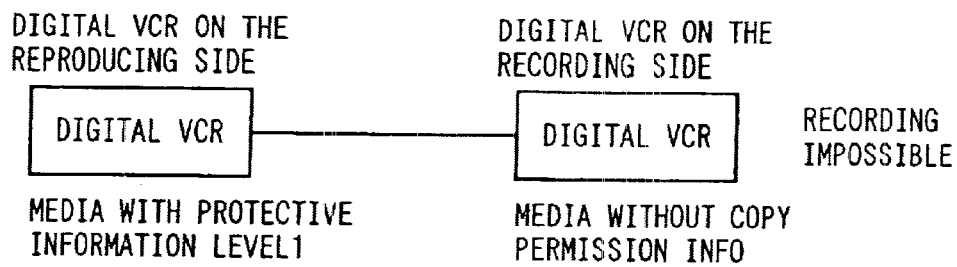
FIGS. 9A, 9B, 9C and 9D are system diagrams for using protective information levels of two stages for dubbing using a digital VCR.

As shown in FIG. 9A, when the reproducing medium, such as a pre-recorded tape or the like, with a first level of protective information is loaded into the reproducing apparatus and a recording medium, such as a blank tape or the like, having no copy permission information is loaded into the recording apparatus, dubbing cannot be executed.

Figure 9B:
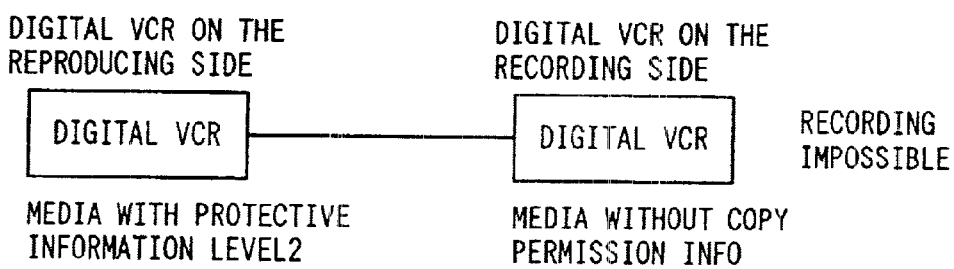

As shown in FIG. 9B, where a reproducing medium having a second level of protective information is loaded into the reproducing apparatus and a recording medium having no copy permission information is loaded into the recording apparatus, dubbing cannot be executed.

Figure 9C:
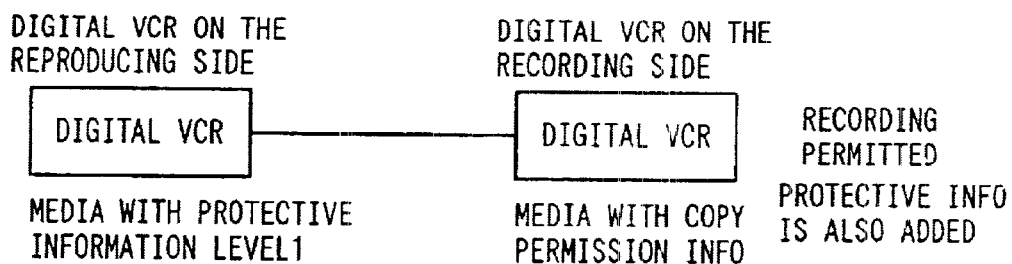

As shown in FIG. 9C, when a reproducing medium having a first level of protective information is loaded into the reproducing apparatus and a recording medium having copy permission information indicating that recording is permitted is loaded into the recording apparatus, dubbing is permitted. In this case, the protective information is recorded onto the blank tape together with the digital data. Therefore, similar protection and copy permission can be maintained for the dubbed data.

Figure 9D:
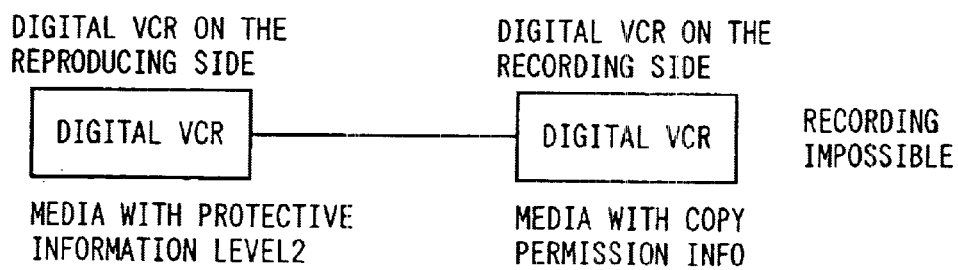
Figure 10:
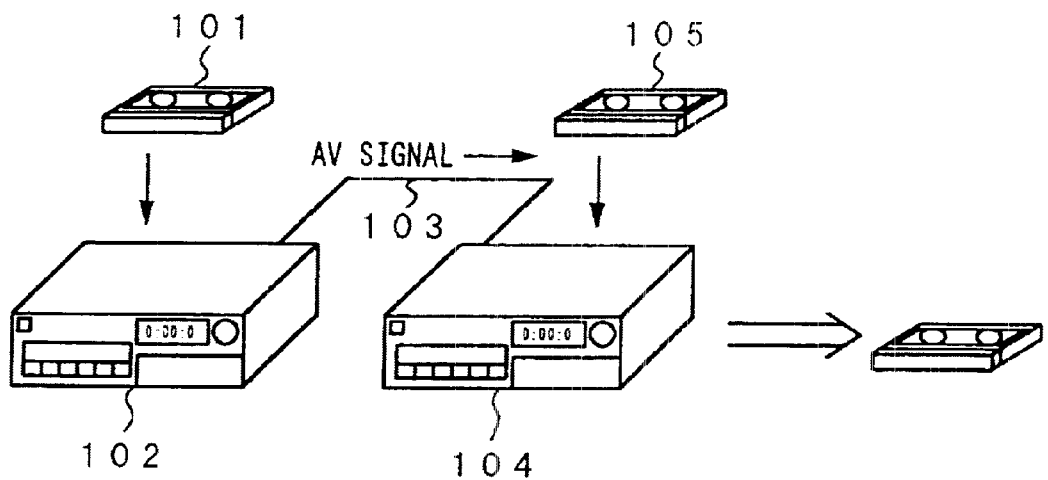
FIG. 10 is a diagram showing an AV system for dubbing a pre-recorded tape onto a blank tape using digital VCRs.

As shown in FIG. 9D, if a reproducing medium having a second level of protective information is loaded into the reproducing apparatus and a recording medium having copy permission information is loaded into the recording apparatus, dubbing cannot be executed. Protective information of two levels is provided so that illegal dubbing can be restricted. The first level of protective information is set to the same level of the copy permission information and the second level of protective information is set to a level higher than that of the copy permission information.

In the foregoing explanation, the invention uses a tape as the medium, however, the invention can also be realized with a disk or the like used as the reproducing and recording media.

Figure 11:
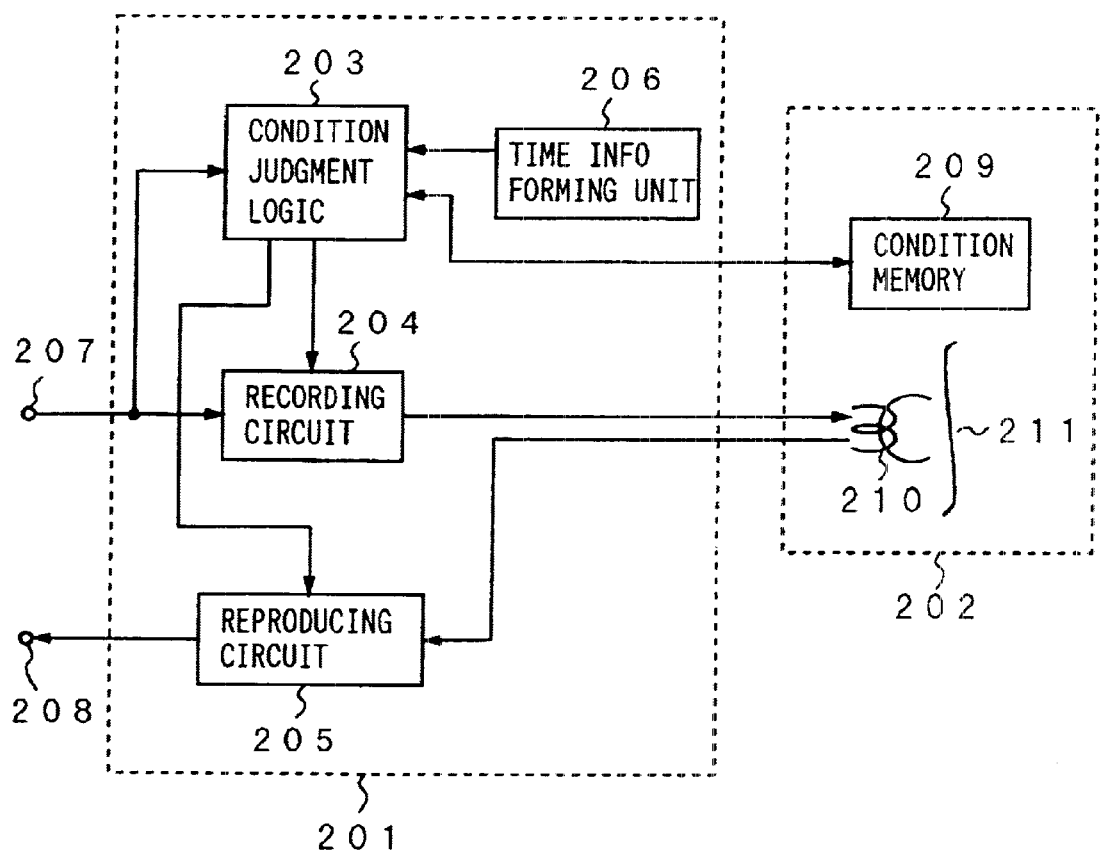
FIG. 11 is a block diagram showing a recording and reproducing system to which the invention can be applied.

FIG. 11 is a block diagram of a recording and reproducing system, for example, a digital VCR or a disk apparatus, to which the invention can be applied. A digital VCR 201 comprises a condition judgment logic circuit 203, a recording circuit 204, a reproducing circuit 205, and time information forming unit 206. A condition memory 209 is provided for a tape cassette 202 of the digital VCR. The condition memory is prepared for every recording medium capable of recording a digital video signal. The condition memory is in a predetermined area (for instance, a subcode area) of, for example, a magnetic tape 211. Alternatively, the condition memory may be provided in a semiconductor memory, such as a MIC (Memory in Cassette), integratedly attached to tape cassette 202. Of course, the condition memory may be provided in both the subcode area of magnetic tape 211 and the MIC integratedly attached to the tape cassette.

In FIG. 11, an analog video signal or a digital video signal is input from an input terminal 207. If the input signal is an analog video signal, copyright protection information (bit1 to bit20) shown in FIGS. 14 and 15 will have been superimposed in, for example, the vertical blanking period. If the input signal is a digital signal, for example, as shown in FIGS. 16 and 17, the copyright protective information will have been superimposed in the digital data. The copyright protective information will be explained in detail later. The input signal is subjected to the usual processing by recording circuit 204 and is recorded onto magnetic tape 211 through a recording and reproducing head 210.

The following six kinds of information can be stored as copyright protective information in condition memory 209: (1) information indicating whether recording is permitted or not or indicating the inhibition or restriction of recording; (2) prepaid fee information corresponding to recording duration information whose dubbing is permitted or to an allotted recording duration; (3) information indicating whether reproduction is permitted or not or indicating reproduction inhibition or restriction; (4) prepaid fee information corresponding to reproduction duration information whose reproduction is permitted or to its allotted reproduction duration; (5) information indicative of a fee category corresponding to a royalty which is charged per unit of recording duration of the recording program; and (6) information indicative of a fee category corresponding to the royalty which is charged per unit of time of reproduction duration of the recorded data.

In the recording mode, condition judgment logic circuit 203 controls recording circuit 204 in the following three ways based on the copyright protection information in condition memory 209. (1) When there is no protective information indicative of dubbing inhibition or restriction in the input signal, normal recording of the input signal by recording circuit 204 can be performed. (2) When the protective information is indicative of dubbing inhibition or restriction and there is no information indicating that recording is permitted in the condition memory, normal recording of the input signal by the recording circuit cannot be executed. For example, recording may be inhibited or disrupted by distorting the operation of the recorder AGC, or the input signal to the recorder may be scrambled, or descrambling of the reproduced input signal may be inhibited, and the like. (3) If protective information is indicative of dubbing inhibition or restriction in the input signal and information in the condition memory indicates that recording is permitted, normal recording of the input signal by recording circuit 204 can be performed in accordance with the recording time information or the prepaid fee information corresponding to the recording duration. When the input signal is recorded, the copyright protective information in the input signal is stored in the condition memory and/or a predetermined area of magnetic tape 211, the latter being different from the condition memory.

In place of the copyright protective information in the input signal, copyright protective information regarding the input signal can also be input to condition judgment logic circuit 203 from outside of the digital VCR.

In the reproducing mode, condition judgment logic circuit 203 controls reproducing circuit 205 in the following two ways based on the copyright protective information in condition memory 209. (1) When protective information is not present in the condition memory to indicate whether reproduction is permitted or not or to indicate reproduction inhibition or restriction, normal reproduction of the recording signal by reproducing circuit 205 can be performed. (2) When protective information is present in the condition memory and indicates whether reproduction is permitted or not or is indicative of reproduction or restriction, normal reproduction of the recording signal by the reproducing circuit can or cannot be performed depending upon whether the reproduction duration information or the prepaid fee information. The foregoing inhibition or distorting techniques may be used to prevent reproduction.

The control operation of condition judgment logic circuit 203 where protective information in the input signal is indicative of dubbing inhibition or restriction but protective information is present in the condition memory to indicate that recording is permitted will now be described.

It is now assumed that the recording duration information is set to RT0 and the prepaid fee information corresponding to the recording duration is set to RM0 in the copyright protection information. It is also assumed that the royalty, which is charged per unit of time the copyright protected input signal is recorded, is set to RCi ($i=1\sim n : n \geq 1$). The royalty RCi can be set to a single value. Also, different royalties RCi can be charged for every pre-recorded program, such that, for example, the royalty is set to a high value for recently released material, such as a software program, video-tape or the like, while the royalty is set to a low value for material which has been released for a long time, or the like.

The input signal with a royalty equal to RCi, which is recorded for a certain duration RT1, will now be described. The recording duration RT1 is obtained by time information forming unit 206. A royalty RCP which is charged for the duration RT1 is obtained by the following equation.

$$RCP = RCi \times RT1$$

When the recording is completed, the recording duration information or the prepaid fee information corresponding to the recording duration in the copyright protective information in condition memory 209 is rewritten. The rewriting of RT0 or RM0 can be performed once at the end of the dubbing or can be performed at a predetermined time interval. The recording duration information RT0 is rewritten by the following equation.

$$RT0 - RT1 \Rightarrow RT0$$

When RT0 is determined for a certain RCi ($i \neq 1$) and the input signal has a different RC1, the recording duration information RT0 is converted and rewritten as follows.

$$RT0 - (RT1 \times RC1 / Rci) \Rightarrow RT0$$

The prepaid fee information RM0 corresponding to the recording duration is rewritten as follows.

$$RM0 - RCP \Rightarrow RM0$$

When RT0 or RM0 is equal to 0, dubbing is inhibited or restricted. Thus, normal recording of the input signal cannot be performed.

Condition judgment logic circuit 203 discriminates whether RT0 or RM0 is equal to 0, therefore, RT0 or RM0 can be used as information indicating whether recording is permitted or not or indicating recording inhibition or restriction.

The recording duration information RT0, the prepaid fee information RM0 corresponding to the recording duration, and the royalty RCi ($i=1\sim n : n \geq 1$) charged for the recording duration of the copyright protected input signal can be replaced by information RT0 indicative of the number of times the data is permitted to be recorded, the prepaid fee information RM0 corresponding to the number of times the data is permitted to be recorded, and the royalty RCi ($i=1\sim n : n \geq 1$) charged for the number of times the copyrighted protected input signal is permitted to be recorded, respectively.

Upon dubbing, the royalty RCi charged for the recording duration the input signal or the royalty input from outside of the digital VCR can be stored to the condition memory as information indicative of a fee category corresponding to the royalty of the pre-recorded program.

Further, the royalty RCi charged per unit of time the input signal is reproduced or the royalty input from outside of the digital VCR can be stored to the condition memory as information indicative of a fee category corresponding to the royalty of the pre-recorded program.

The operation of condition judgment logic circuit 203 where protective information is present in the condition memory to determine whether reproduction is permitted or not or whether reproduction is inhibited or restricted will now be explained.

It is assumed that the reproduction duration information is set to PT0 and the prepaid fee information corresponding to the reproduction duration is set to PM0. It is also assumed that the royalty which is charged for the duration of the reproduction of the copyright protected input signal is set to PCi ($i=1\sim n : n \geq 1$). The royalty PCi can be set to a single value. A plurality of royalties PCi also can be set to allow different royalties to be charged for every pre-recorded or broadcast program so that, for example, the royalty is set to a high value for a recently released program and the royalty is set to a low value for program which has been released for a long time, or the like.

In this instance, the input signal whose royalty is PCi is reproduced for a duration PT1. The reproducing duration PT1 is obtained by duration information derived from time information forming unit 206. A royalty PCP which is charged for the duration PT1 is obtained as follows.

$$PCP = PCi \times PT1$$

When the reproduction is completed, the reproduction duration information or the prepaid fee information corresponding to the reproduction duration of the copyright protective information is rewritten. The rewriting of PT0 or PM0 can be performed once at the end of the dubbing or can be performed at predetermined time intervals. The reproducing duration information PT0 is rewritten as follows.

$$PT0 - PT1 \Rightarrow PT0$$

When PT0 is determined for a certain PCi ($i \neq 1$), and the input signal has a different PC1, the reproducing duration information PT0 is rewritten as follows.

$$PT0 - (PT1 \times PC1 / PCi) \Rightarrow PT0$$

The prepaid fee information PM0 corresponding to the reproduction duration is obtained by the following expression.

$$PM0 - PCP \Rightarrow PM0$$

When PT0 or PM0 is equal to 0, reproduction is inhibited or restricted. Thus, normal reproduction of the recording signal cannot be executed.

Condition judgment logic circuit 203 discriminates whether PT0 or PM0 is equal to 0 or not, therefore, PT0 or PM0 can be used as information which indicates whether reproduction is permitted or not or which indicates reproduction inhibition or restriction.

The reproduction duration information PT0, the prepaid fee information PM0 corresponding to the reproducing duration, and the royalty PCi (i=1~n:n≧1) charged per unit of time the copyright protected input signal is reproduced can be replaced by the information PT0 indicative of the number of times the signal is permitted to be reproduced, the prepaid fee information PM0 corresponding to the number of times the signal is permitted to be reproduced, and the royalty PCi (i=1~n:n≧1) charged for the number of times the copyright protected input signal is permitted to be reproduced, respectively.

Figure 12:
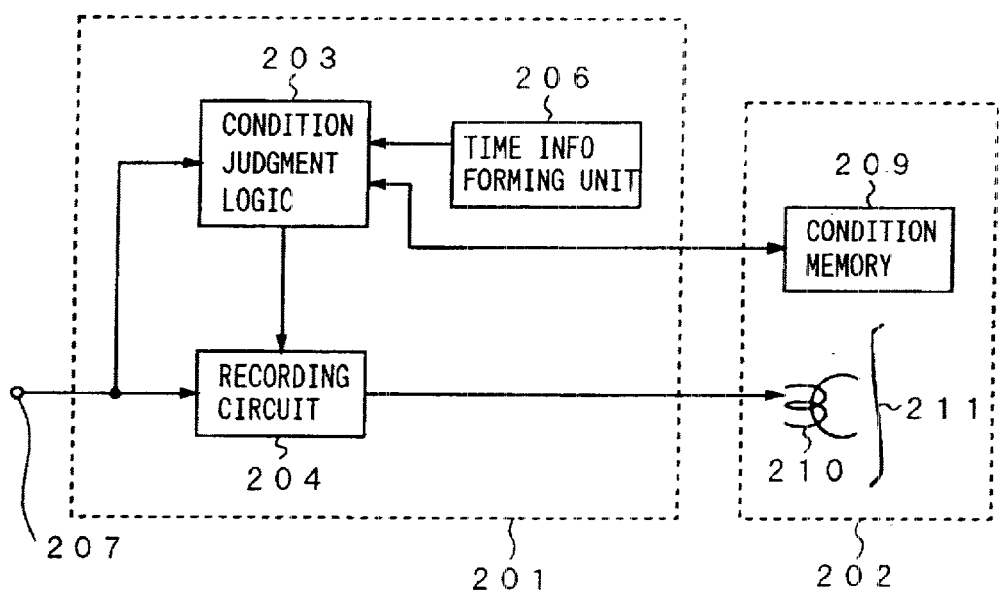
FIG. 12 is a block diagram showing a recording system to which the invention can be applied.

FIG. 12 shows an example of a recording system, for example, a recording system of a digital VCR, to which the invention can be applied. A digital VCR 201 is comprised of condition judgment logic circuit 203, recording circuit 204, and time information forming unit 206. Tape cassette 202 of the digital VCR has condition memory 209. Those portions having the same reference numerals as in FIG. 11 have similar construction and function, therefore, their descriptions are omitted.

Figure 13:
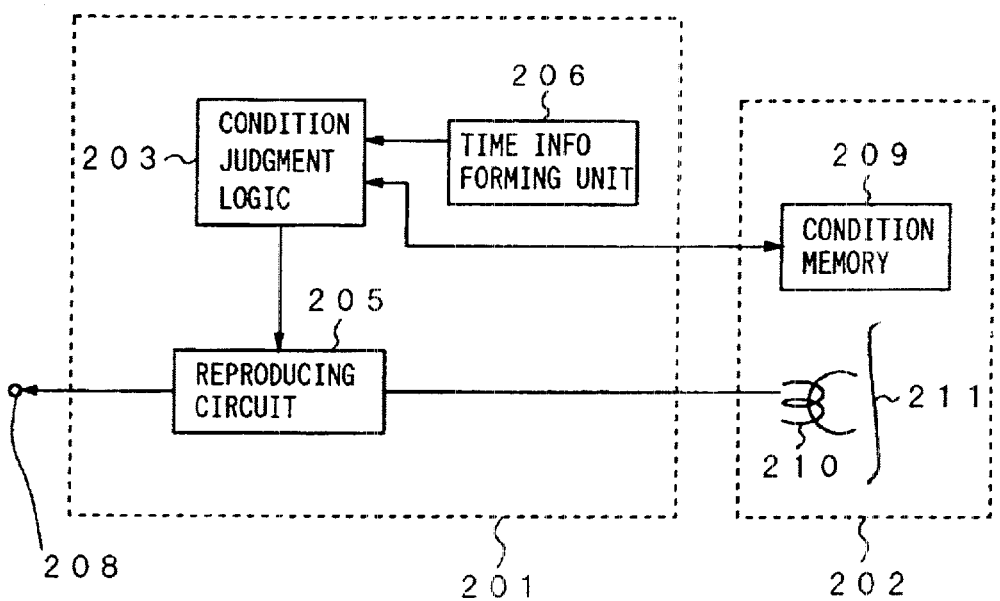
FIG. 13 is a block diagram showing a reproducing system to which the invention can be applied.

FIG. 13 shows an example of a reproducing system, for example, a reproducing system of a digital VCR, to which the invention is applied. Digital VCR 201 is comprised of condition judgment logic circuit 203, reproducing circuit 205, and time information forming unit 206. Tape cassette 202 of the digital VCR has condition memory 209. These-components correspond to those designated by the same reference numerals in FIG. 11 having the same construction and functions, and therefore, their descriptions are omitted.

Figure 14:
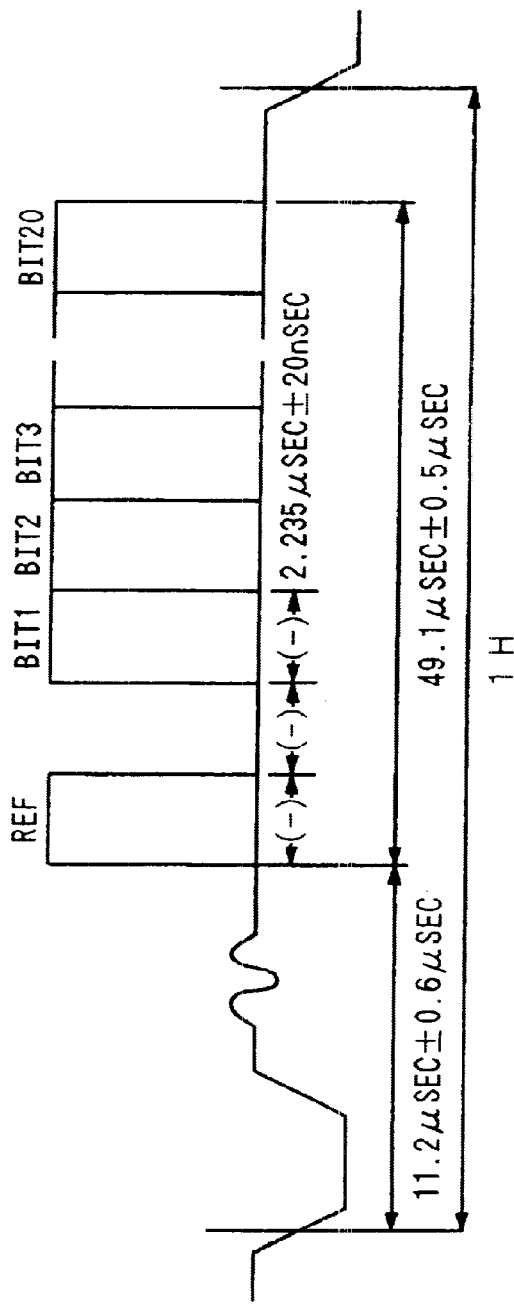
FIG. 14 is a diagram showing copyright protective information superimposed in a vertical blanking period.
Figure 15:
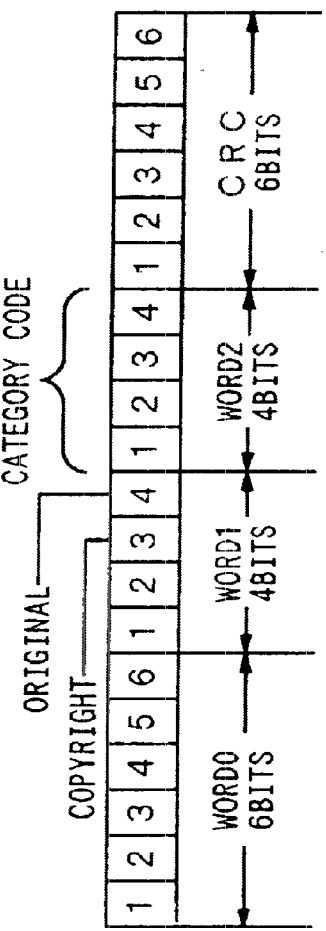
FIG. 15 is a diagram showing the structure of copyright protective information superimposed in a vertical blanking period.

FIGS. 14 and 15 are diagrams which show copyright protective information superimposed in the V blanking period of an analog video signal. The copyright protective information is a signal of 20 bits which is superimposed in the V blanking period. A reference bit is provided before the signal of 20 bits.

As shown in FIG. 15, the signal of 20 bits is constructed by word0 of six bits, word1 of four bits, word2 of four bits, and CRC of six bits. Basic parameter and identification ID information regarding a transmission formation are inserted at word0. Bits indicating the presence or absence of copyright protection and indicating whether the software is original or not are included at word1. For example, the third bit of word1 indicates the presence or absence of copyright protection. When the third bit is equal to "0", copyright protection is present. When the third bit is equal to "1", there is no copyright protection. The fourth bit of the word1 indicates whether the software is original or not. When the fourth bit is equal to "0", there is no designation. When the fourth bit is equal to "1", the software is a recorded software which was commercially released. A category code of the apparatus is inserted in the word2.

Figure 16A:
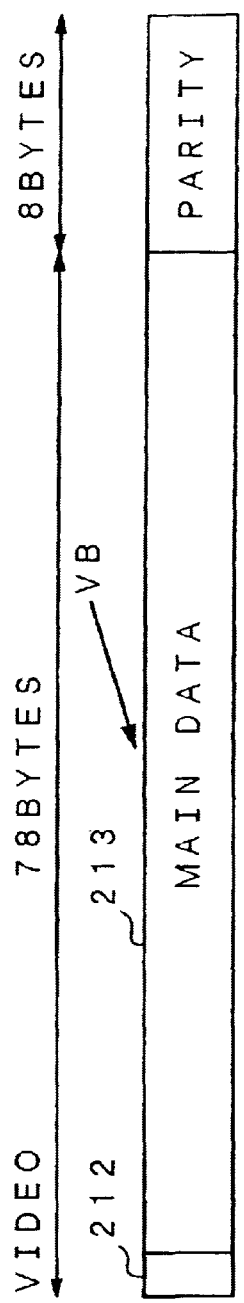
FIGS. 16A and 16B are diagrams showing the copyright protective information superimposed on digital data.
Figure 16B:
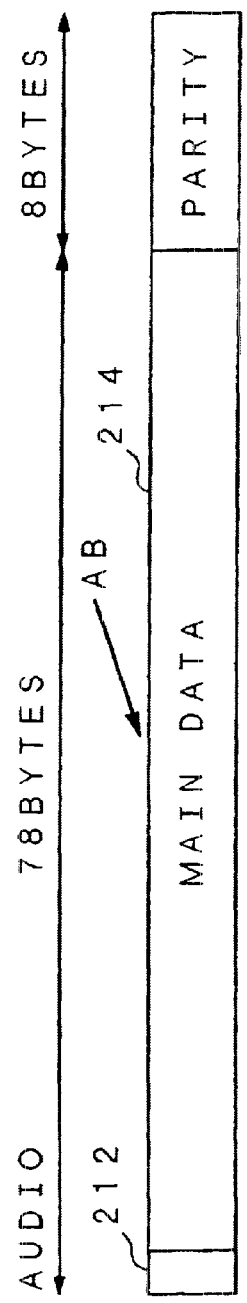
Figure 17:
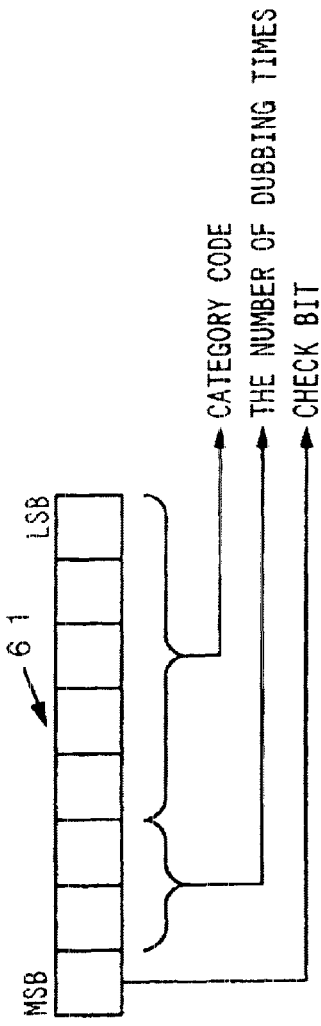
FIG. 17 is a diagram showing the structure of the copyright protective information superimposed on the digital data.

FIGS. 16A, 16B and 17 are diagrams which show copyright protective information superimposed on a digital video signal. As shown in FIGS. 16A and 16B, a dubbing number restriction code 212 consisting of one byte is inserted in the head portion of main data 213 and 214 in an image data block VB and an audio data block AB, respectively. In the dubbing number restriction code, for example, as shown in FIG. 17, the head bit is a check bit indicating whether the software is copyright protected or not, the next two bits contain data indicative of the present number of dubbing times and the remaining five bits contain classification data indicating whether a source of the image data is a tape, a disk, or a broadcast program.

For example, if the image and audio data are copyright protected and the source is a magnetic tape which has already been dubbed once, dubbing number restriction code 212 is "101XXXXX" (the XXXXX indicates that the category code is set to a "don't care" state).

Figure 18:
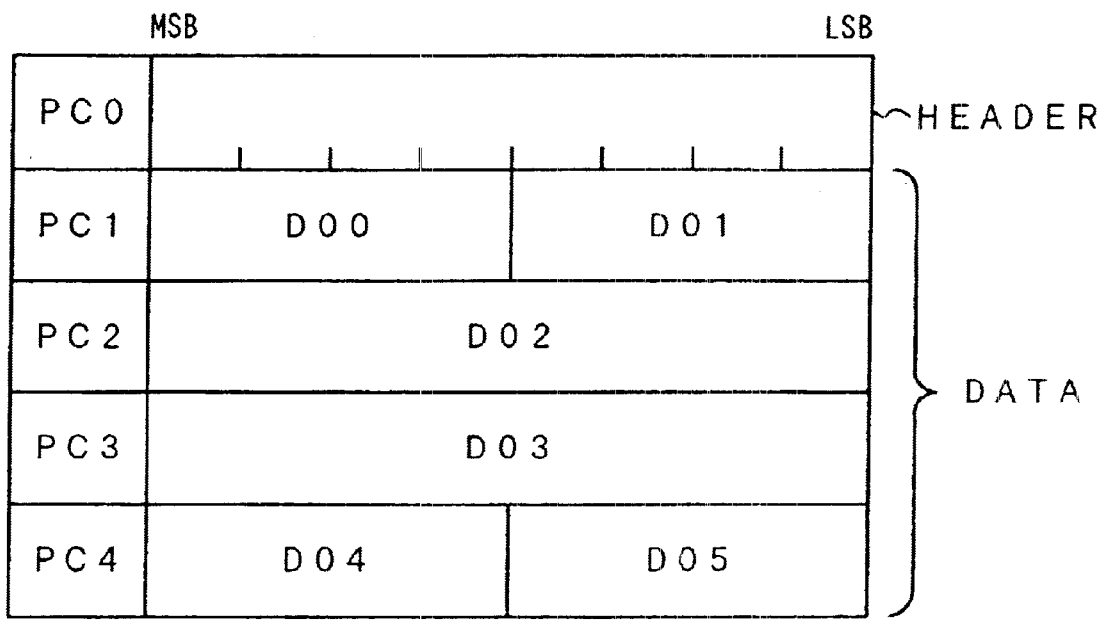
FIG. 18 is a diagram showing a copyright protective information pack.

FIG. 18 is a diagram which show copyright protective information stored in condition memory 209. The copyright protective information is described by, for example, a pack structure. The "pack" indicates a minimum unit of a data group and each pack is constructed of five bytes. The first byte is a header and the remaining four bytes contain data. The eight bits of the header are divided to four upper bits and four lower bits, to form a hierarchy structure. Although a fixed length of five bytes is set as the basic length of the pack structure, a structure having a variable length can also be used.

The four upper bits (D00) of PC1 contain information indicative of a fee category corresponding to the royalty charged per unit of time for recording a pre-recorded program. Sixteen dubbing fee categories can be expressed in those four bits.

The four lower bits (D01) of PC1 contain information indicative of a fee category corresponding to the royalty charged per unit of time a pre-recorded program is reproduced. Sixteen reproduction fee categories can be expressed in these four bits.

Byte PC2 indicates recording duration information or prepaid fee information corresponding to the recording duration. The recording duration information or the prepaid fee information corresponding to the recording duration can be expressed by the bits (D02) of PC2 within a range 0 to 255 times as large as a unit of time for recording or a unit prepaid fee.

Byte PC3 indicates reproduction duration information-or prepaid fee information corresponding to its reproduction duration. The reproduction duration information or the prepaid fee information corresponding to its reproduction duration can be expressed by the bits (D03) of PC3 within a range 0 to 255 times as large as a unit of time for reproduction or a unit prepaid fee.

The four upper bits (D04) of PC4 contain information indicating whether the recording is permitted or not or indicating recording inhibition or restriction. Thus, the presence or absence of the copyright protection and, for example, the number of times the signal is dubbed can be expressed.

The four lower bits (D05) of PC4 contain information indicating whether the reproduction is permitted or not or indicating reproduction inhibition or restriction. Thus, the presence or absence of the copyright protection and, for example, the number of times the signal is reproduced can be expressed.

Although an example of the digital VCR has been described so far as a recording and reproducing system, the invention can also be similarly embodied in a disk apparatus or a recording and reproducing system using another recording medium.

According to the invention, permitting, restricting or inhibiting the recording or dubbing of digital data can easily be controlled by using protective information and copy permission information. The copyright can be further protected by using multiple stages or levels of protective information. Thus, although a broadcast video image can be seen on a television or a monitor, the recording of the video image can be controlled. By recording the protective information of the original data with the data when copies are made, similar protection/copy permission can be maintained even when the dubbed/recorded contents are recorded or dubbed again.

According to the invention, permission, inhibition, or restriction of the dubbing of the information signal can be effectively performed at the time of recording by using the recording permission information used to determine recording permission, a recordable duration of the information signal, or the number of times the information signal is permitted to be recorded and copyright protective information indicative of the fee for recording a predetermined unit of time of the information signal or the number of times the information signal is permitted to be recorded stored in the recording medium.

Even if the fee for recording a predetermined unit of time of the information signal or the number of times the information signal is recorded is set so as to be different for every information signal, a royalty for the dubbing of each information signal can be correctly charged.

According to the invention, the reproduction of the information signal can be permitted, inhibited or restricted effectively at the time of the recording using the reproduction permission information to determine reproduction permission for a reproducible duration of the information signal or the number of times the information signal is permitted to be reproduced and copyright protection information indicative of the fee for reproducing the information signal for a predetermined unit of time or the number of times the information signal is reproduced stored in the recording medium.

Even when the fee regarding the reproduction for a predetermined unit of time of the information signal or the number of times the information signal is reproduced is set so as to be different for every information signal, a royalty for the reproduction of each information signal can be correctly charged.

The present invention is not limited to the foregoing embodiments but many modifications and variations are possible within the spirit and scope of the appended claims of the invention.

We claim:

1. An audio/visual (AV) recording method, comprising the steps of:

loading a recording medium capable of recording new digital data into a recording unit; and recording said new digital data onto said recording medium based on copy permission information stored in said recording medium and protective information included in said new digital data, wherein said copy permission information is not included in said new digital data but is included in said recording medium prior to any attempted recording of said new digital data.

2. A recording medium capable of being loaded into a recording unit for recording new digital data, comprising:

copy permission information stored in said recording medium; and new digital data recorded onto said recording medium based and protective information included in said new digital data;

wherein said copy permission information is not included in said new digital data but is included in said recording medium prior to any attempted recording of said new digital data.

3. A recording system for recording an information signal, said recording system comprising a recording apparatus for recording an information signal onto a recording medium; and and control apparatus for controlling said recording according to copy permission information stored in a recording condition memory of said recording medium, said copy permission information not being included in said information signal and being stored in said recording condition memory prior to any attempted recording of said information signal, and said copy permission information representing a recording duration of said information signal or a number of times said information signal is permitted to be recorded, wherein said information signal is only recorded for a predetermined duration or said number of times and normal recording of said information signal is inhibited at other times.

4. A reproducing system for reproducing an information signal, comprising:

a reproducing apparatus for reproducing an information signal from a recording medium; and a controller for controlling said reproducing according to reproduction permission information stored in a reproducing condition memory of said recording medium, said reproduction permission information not being included in said information signal and being stored in said reproducing condition memory prior to the storage of said information signal onto said recording medium, and said reproduction permission information representing a reproduction duration or a number of times said information signal is permitted to be reproduced, wherein said information signal is only reproduced for a predetermined duration or said number of times and normal reproduction of said information signal is inhibited at other times.

* * * * *